United States Patent
Giacopelli et al.

(10) Patent No.: US 6,324,410 B1
(45) Date of Patent: Nov. 27, 2001

(54) METHOD AND APPARATUS FOR INTERFACING A CELLULAR FIXED WIRELESS TERMINAL TO THE EXTENSION SIDE OF A PBX/PABX

(75) Inventors: Daniel Giacopelli, Deer Park; Frederick Engelking, Northport; Rex Nathanson, Dix Hills, all of NY (US)

(73) Assignee: Telular Corp., Vernon Hills, IL (US)

( * ) Notice: Subject to any disclaimer, the term of this patent is extended or adjusted under 35 U.S.C. 154(b) by 0 days.

(21) Appl. No.: 09/408,709

(22) Filed: Sep. 30, 1999

(51) Int. Cl.[7] .................................................. H04Q 7/26
(52) U.S. Cl. ........................................ 455/554; 455/524
(58) Field of Search ................................. 455/554, 555, 455/422, 524, 516; 379/156, 355

(56) References Cited

U.S. PATENT DOCUMENTS

| | | | |
|---|---|---|---|
| 5,471,523 | * 11/1995 | Smith et al. | 379/156 X |
| 5,594,944 | * 1/1997 | Ogata et al. | 455/516 |
| 5,787,355 | * 7/1998 | Bannister et al. | 455/554 X |
| 5,812,637 | * 9/1998 | Schornack et al. | 455/554 X |
| 5,946,390 | * 8/1999 | Boakes | 379/355 |

* cited by examiner

Primary Examiner—William Trost
Assistant Examiner—Philip J. Sobutka
(74) Attorney, Agent, or Firm—Hamman & Benn

(57) ABSTRACT

A private branch exchange (PBX/PABX) is provided with a fixed wireless terminal, which allows both incoming and outgoing calls to be made on the private branch exchange. The fixed wireless terminal is coupled to the private branch exchange via an interface unit connected to one of the analog extension lines of the private branch exchange. A telephone extension serviced by the PBX/PABX places a call to a remote cellular telephone, or a remote cellular telephone user places a call to the telephone extension. When the PBX-user makes a call to a remote cellular telephone, one picks up a local PBX/PABX extension, and hears a dial tone, signifying that the PBX/PABX is ready to service his call. The caller then dials the directory number of the PBX/PABX extension which is provided for cellular calls. The PBX/PABX then automatically connects the caller to the cellular extension, which is the interfaced fixed wireless terminal. The caller then dials the directory number of the remote cellular telephone, and waits for connection. When a remote cellular telephone user calls the fixed wireless terminal interfaced to the PBX/PABX, he simply dials the cellular directory number of that fixed wireless terminal in the usual manner. When the fixed wireless terminal answers, the caller will hear the dial tone of the interfaced PBX/PABX, signifying that the PBX/PABX is ready to service his call. The remote caller then dials the extension on the PBX/PABX for the party to whom he wishes to speak, and is then connected.

12 Claims, 4 Drawing Sheets

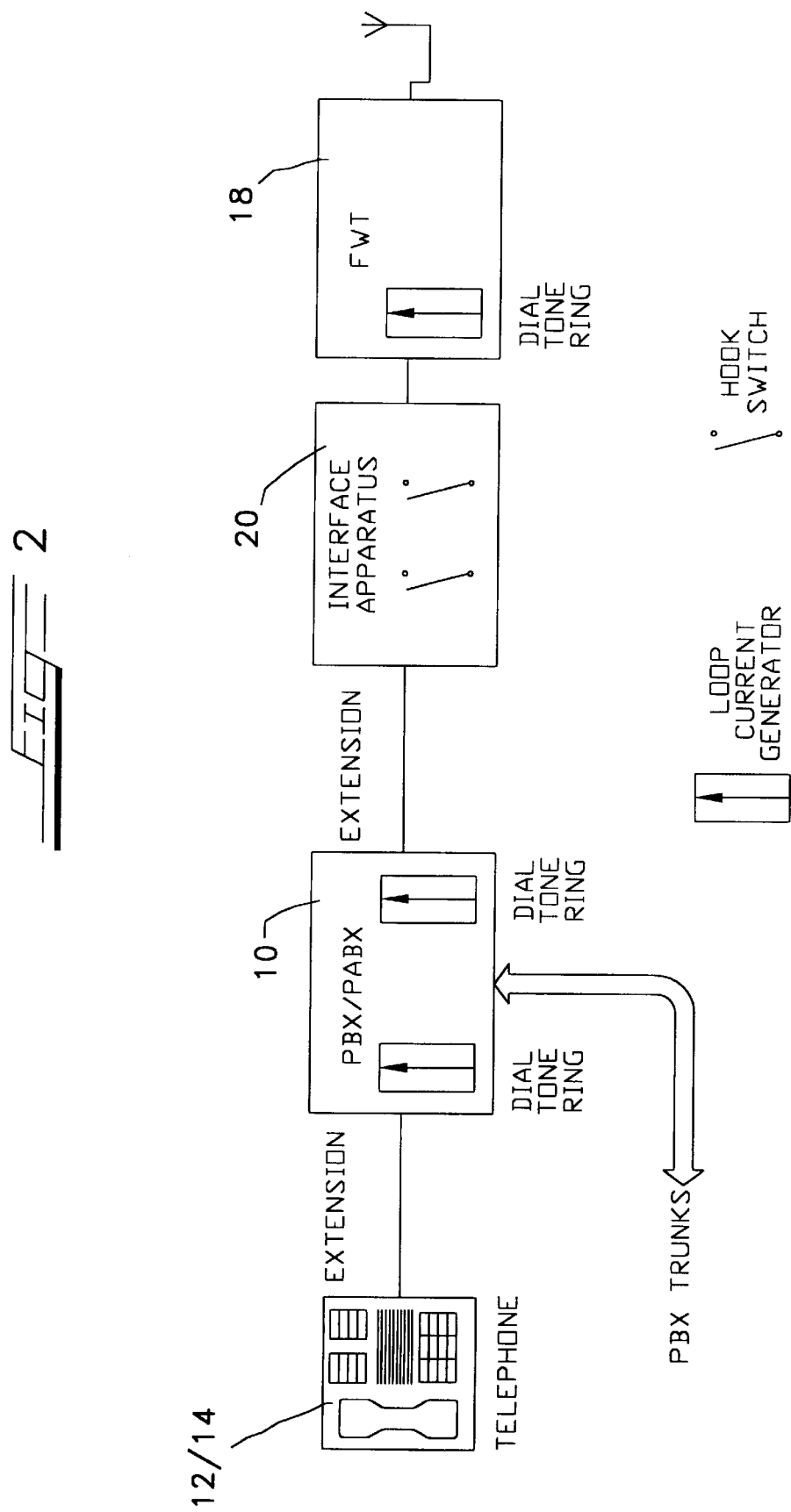

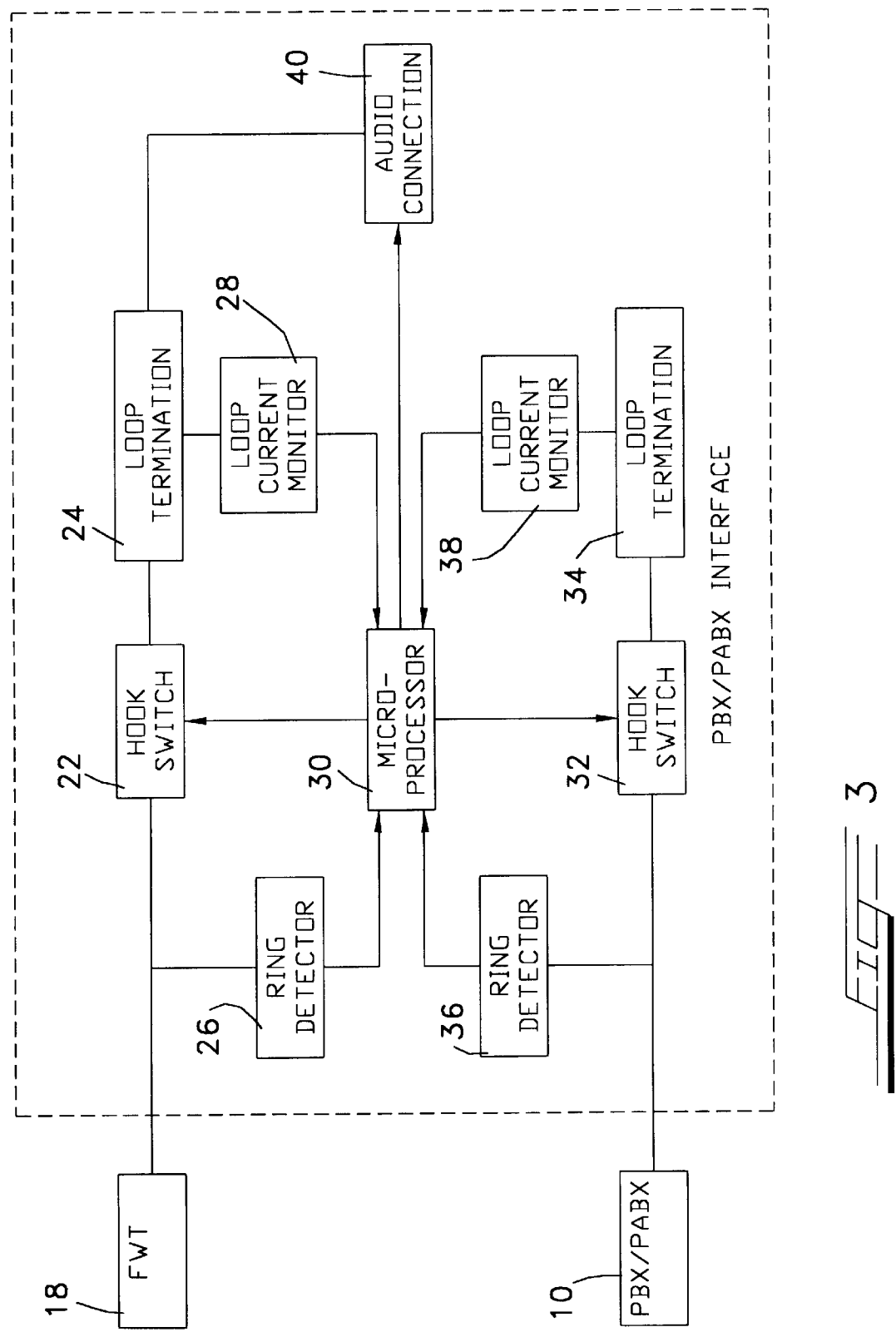

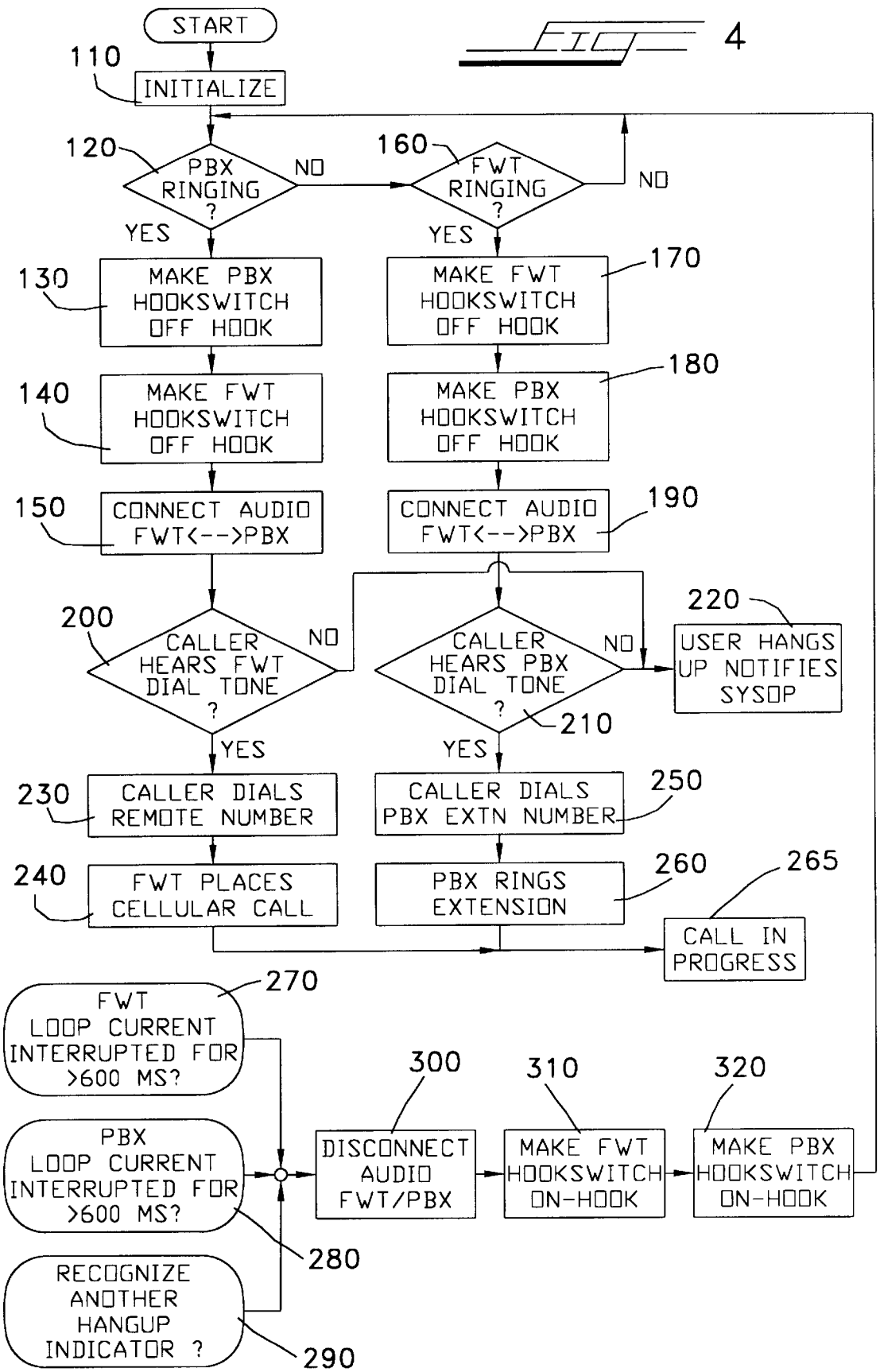

METHOD AND APPARATUS FOR INTERFACING A CELLULAR FIXED WIRELESS TERMINAL TO THE EXTENSION SIDE OF A PBX/PABX

BACKGROUND OF THE INVENTION

The present invention is directed to a method of interfacing a fixed wireless terminal (FWT). A fixed wireless terminal, as disclosed in commonly-owned U.S. Pat. No. 4,658,096, which patent is incorporated by reference herein, couples a standard land-line telephone, such as a POTS telephone, facsimile machine, and the equivalents thereof, to a cellular transceiver, whereby the land-line telephone may be used for making and receiving calls over the cellular network.

The FWT device emulates Telco Central Office (CO) functions in order to connect the land-line telephone to the cellular wireless network. The FWT provides telephone service using standard telephone devices in places where landline service is either not available or is less economically advantageous.

While the predominant use of an FWT is to couple a standard POTS-type telephone to a cellular wireless network, an FWT has been used for coupling the FWT to a trunk port or analog port on the CO-side of a PBX/PABX (Private Branch Exchange or Private Automatic Branch Exchange), in order to thereby provide wireless service for the PBX or PABX over the cellular network. However, this use of the analog port of the PBX or PABX often requires considerable modifications to the FWT hardware and/or re-programming of the software of the PBX/PABX to accommodate this connection. However, in contrast, connection of a conventional analog telephone device (such as a POTS telephone device) to the extension side of the PBX/PABX usually requires no modifications other than provision of a usually already-existing analog extension port.

An FWT cannot be connected directly to the extension side of the PBX/PABX, because both the FWT and the PBX/PABX provide CO-side connections; i.e., they are both designed to provide loop current and ring signal for the land-line telephone instrument. Connecting the FWT directly to the PBX/PABX at the extension side of the PBX/PABX, would result in damage to one or both of them.

It is, therefore, beneficial and desirable to provide an apparatus which can reside between the common FWT and the PBX/PABX to accommodate the existing interfaces, whereby the FWT may be coupled to the extension side of the PBX/PABX, whereby any of the land-line telephones connected to the PBX/PABX may also be used to make calls or to receive calls over the cellular wireless network by means of the FWT coupled to the extension side of the PBX/PABX. These connections may be made in multiple, in order to provide multiple wireless lines.

It is, therefore, the objective of the present invention to provide a method and apparatus for interfacing a fixed wireless terminal (FWT) to the extension side of a Private Branch Exchange (PBX) or Private Automatic Branch Exchange (PABX), whereby the PBX/PABX may make or receive calls over the cellular wireless network via a fixed wireless terminal, such as that disclosed in commonly-owned U.S. Pat. No. 4,658,096.

SUMMARY OF THE INVENTION

It is, therefore, the primary objective of the present invention to provide a method of coupling a fixed wireless terminal to a conventional PBX/PABX, whereby the land-line telephones connected to and serviced by the PBX/PABX may make or receive calls over the cellular wireless network by means of the fixed wireless terminal.

It is another objective of the present invention to provide such a coupling of a fixed wireless terminal to a conventional PBX/PABX by interfacing the FWT to the extension side of the PBX/PABX, thereby obviating extensive and costly changes and modifications to the PBX/PABX and the FWT.

The operation of the PBX/PABX with attached FWT, according to the invention, takes two forms: A telephone extension serviced by the PBX/PABX places a call to a remote cellular telephone, or a remote cellular telephone user places a call to a telephone extension of the PBX/PABX. When the PBX-user makes a call to a remote cellular telephone, one picks up a local PBX/PABX extension, and hears a dial tone, signifying that the PBX/PABX is ready to service his call. The caller then dials the directory number of the PBX/PABX extension which is provided for cellular calls; for example, 201. The PBX/PABX then automatically connects the caller to the cellular extension, which is the interfaced FWT, and receives another, perhaps distinct, dial tone, signaling that the FWT is ready to service his call. The caller then dials the directory number of the remote cellular telephone, and waits for connection. If the call is connected, conversation commences. When the call is completed, at least one of the participants hangs up, and both ends of the call are disconnected.

When a remote cellular telephone user calls the FWT interfaced to the PBX/PABX, he simply dials the cellular directory number of that FWT, in the usual manner. When the FWT answers, the caller will hear the dial tone of the interfaced PBX/PABX, signifying that the PBX/PABX is ready to service his call. The remote caller then dials the extension on the PBX/PABX for the party to whom he wishes to speak, and is then connected. When the call is completed, at least one of the participants hangs up, and both ends of the call are disconnected.

BRIEF DESCRIPTION OF THE DRAWINGS

The invention will be more readily understood with reference to the accompanying drawings, wherein:

FIG. 2 is a block diagram showing the one extension side of the PBX/PABX to which is interfaced a fixed wireless terminal (FWT) according to the method of the present invention;

FIG. 3 is a block diagram of the interface unit coupling the fixed wireless terminal to the extension side of the PBX/PABX according to the method of the present invention; and FIG. 4 is a flow chart showing the logic operations whereby the PBX/PABX and the fixed wireless terminal may alternatively make or receive calls over the cellular wireless network, according to the method of the present invention.

DETAILED DESCRIPTION OF THE INVENTION

Figure 1:
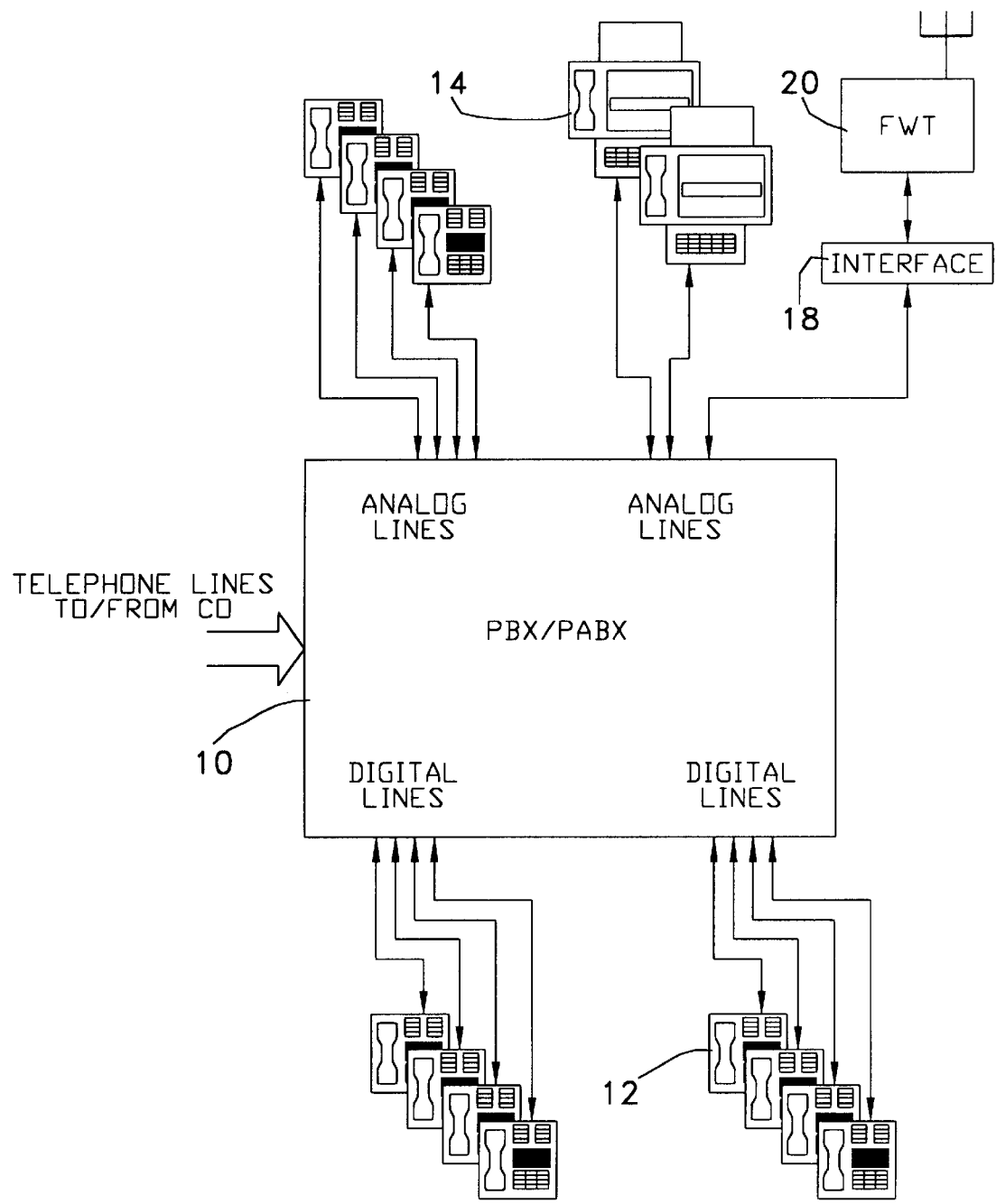
FIG. 1 is a schematic showing a PBX/PABX having a fixed wireless terminal interfaced to one extension side of the PBX/PABX according to the present invention.

Referring now to the drawings in greater detail, and to FIG. 1 for now, there is shown a PBX/PABX 10 incorporating an interfaced fixed wireless terminal, according to the method of the invention. The PBX or PABX 10 has a plurality of telephone extensions connected to it for servicing them. Some of the extensions may be digital telephones 12 connected to the digital lines of the PBX or PABX—digital telephones incorporate proprietary digital interfaces which are provided by the PBX/PABX manufacturer—while others are analog telephones 14 connected to the PBX or PABX by means of the analog lines of the PBX or PABX. In accordance with the present invention, a fixed wireless terminal (FWT) 18 is also coupled to an analog line of the PBX or PABX by means of an interfacing unit 20 of the present invention. Since both the FWT and the PBX/PABX both provide central-office functions to a standard land-line telephone instrument, it is not possible to directly connect the FWT to the analog line of the PBX or PABX without sustaining considerable damage to either the PBX/PABX or FWT. Moreover, such a direct connection would not provide an operable system. The interfacing unit 20 ensures an operable system, as well preventing damage either to the PBX/PABX or FWT.

Referring now to FIG. 2, there is shown high-level block diagram showing the interfacing unit 20 that interfaces the FWT to the PBX/PABX analog extension port, and some of the signals generated by the PBX/PABX and the FWT which must be recognized and acted upon by the apparatus, such as dial tone, ring, etc. The interfacing unit 10 provides hook-switch equivalents in both directions, and interconnects the audio paths.

Referring to FIG. 3, there is shown a detailed block diagram of the interfacing unit 20 used to interface the FWT to the analog port of the PBX/PABX. The interfacing unit 20 is comprised of two channels: One for the fixed wireless terminal, and one for the PBX/PABX, both of which operate virtually identically. The first channel circuit connected to the fixed wireless terminal consists of a conventional hook-switch device 22, conventional loop-termination means 24, conventional ring detector apparatus 26, and conventional loop-current monitor 28, all of which are connected to a microprocessor 30. The second channel circuit connected to the analog port of the PBX or PABX similarly consists of: conventional hook-switch device 32, conventional loop-termination means 34, conventional ring detector apparatus 36, and conventional loop-current monitor 38, all of which are connected to microprocessor 30. Audio connection between the analog port of the PBX or PABX and the fixed wireless terminal is provided by an audio-line connection 40 that is connected to the tip and ring lines of both.

Each channel circuit properly terminates and acts upon the signals normally provided to a POTS telephone. The ring detectors 26, 36 signal the microprocessor 30 that their respective CO-like connection is sending a ring signal. The loop terminations 24, 34 provide the audio and DC termination impedances of a telephone. When connected by the hook switch device 22,32 normal loop current flows. The presence of loop current is monitored by the loop current monitors 28, 38. The audio connection provides a bi-directional path to interconnect the telephone audio signals.

Referring now to FIG. 4, there is shown a flow chart of the software process controlled by the microprocessor 30 of the interfacing unit 20. The apparatus' hardware and software are initialized in the first step (block 110). The interfacing unit 20 then waits for a ring signal from either the PBX/PABX (block 120) or the FWT (block 160). When the PBX/PABX rings the interface apparatus, meaning that one of the PBX extensions wishes to place an outgoing cellular call, then the interfacing unit 20 must make the hook-switch 32 go off-hook (block 130) to indicate to the PBX/PABX that the call has been answered. It must, also, in turn, cause the hook switch 22 go off-hook for the FWT (block 140) to indicate to the FWT that it must set up for an outgoing cellular call. The software of the invention then connects the audio paths between the PBX/PABX and the FWT (block 150). The caller will then hear a distinctive dial tone from the FWT (block 100) in order to indicate that the caller should dial the directory number of the remote cellular telephone he wishes to call (block 230). The FWT 18 will then place the cellular call (block 240). If the caller hears a trouble tone such as a "no service" tone, he must hang up and notify someone of the problem (block 220). The software of the interfacing unit 20 must next determine when to tear down the connection. If the call is successful, and the parties converse, or if the call does not go through, someone will hang up. If the remote cellular user ends the call, the FWT will interrupt the loop current for at least 600 ms (block 270) which, in effect, tells the apparatus to disconnect the audio (300), disconnect the FWT by going on-hook (310) by means of the hook switch 22, and disconnect the PBX/PABX by going on-hook (320) by means of the hook switch 32. The interfacing apparatus 20 then resumes its initial operating state of waiting for one of the lines to ring (blocks 120 and 160). If the local caller on the PBX/PABX ends the call by hanging up, the PBX/PABX will, in most cases, provide the loop current interruption described above (block 280), with the same results (block3 300, 310, 320). While most modern PBX/PABXs provide the loop current interruption at the end of a call, some may not. In t hose relatively rare cases, another hang-up or end of call indicator must be recognized (block 290). Some examples include return of dial tone, provision of a distinctive tone (busy or reorder), or disconnection, which is a long interruption that fits the >600 ms case stated above.

Operation when the FWT initiates the call, which occurs if a remote cellular telephone calls the cellular number of the transceiver of the FWT 20, in order t o be connected to an ex tension serviced by the PBX/PABX 10, is virtually identical to that for the PBX/PABX initiation of the call described, with the exception that the roles of the two units are interchanged. Thus, the software of the interfacing unit will detect the ringing of the FWT (block 160) by means of the ring-detector apparatus 26. Then, the software makes the FWT hook-switch 22 go off-hook (block 170), as well as making the PBX's hook-switch 32 go off-hook (block 180). The audio path 40 is thus connected (block 190). Upon the PBX going off-hook, if the remote caller will hear the PBX's dial tone (block 210), then the caller dials the extension of the PBX he wants (block 250), with that extension then ringing and going off-hook when it is answered (block 260). If the caller does not hear a dial tone from the PBX , or hears a trouble tone, or the like, he must hang up and notify the system operator (block 220). After the call is completed, then the same routine ensues as described above for the outgoing call from a PBX extension to a remote cellular telephone (blocks 270, 280, 290, 300, 310 and 320).

While a specific embodiment of the invention has been shown and described, it is to be understood that numerous changes and modifications may be made therein without departing from the scope and spirit of the invention as set forth in the appended claims.

What we claim is:

1. In a private branch exchange (PBX/PABX) comprising a plurality of analog telephone extensions for connecting a plurality of landline telephone extensions thereto in order to be serviced thereby, the improvement comprising:

A cellular fixed wireless terminal operatively coupled to one of said plurality of analog telephone extensions, said cellular fixed wireless terminal providing central-office functions, such as ring voltage and dial tone for a landline, POTS-type telephone; and cellular interfacing means for coupling said cellular fixed wireless terminal to said one analog telephone extension;

said cellular fixed wireless terminal comprising a cellular or cellular-like transceiver and cellular interface adapting means for coupling a landline-type telephone instrument to said cellular or cellular-like transceiver, and for providing central-office functions, such as ring voltage and dial tone, for the landline-type telephone instrument; whereby at least one of an incoming call and an outgoing call may be effected by said cellular fixed wireless terminal via the private branch exchange.

2. The private branch exchange (PBX/PABX) according to claim 1, wherein said interfacing means comprises ring detector means for detecting when one of said fixed wireless terminal and private branch exchange emit ring signals, hook-switch means for causing the said fixed wireless terminal and private branch exchange to go off-hook or on-hook, loop-termination means for terminating a call, loop-current monitoring means for determining that a call is in progress or has ended, and audio-path connection means for providing audio connection between said fixed wireless terminal and said private branch exchange; and computer means comprising software means for controlling the operation of each said hook switch means, and audio connection means; said ring detection means and said loop-current monitor means being coupled to said computer means.

3. The private branch exchange (PBX/PABX) according to claim 2, wherein each loop-current monitoring means for monitoring the loop current of said fixed wireless terminal and private branch exchange detects a loop-current interrupt causing the computer means, to thereby disconnect the audio connection between said fixed wireless terminal and said private branch exchange and place both said hook-switch means in the on-hook condition to cause the fixed wireless terminal and PBX/PABX to reset to an initial condition of waiting for ring signals.

4. The private branch exchange (PBX/PABX) according to claim 1, wherein said interfacing means comprises two circuit paths, one for said fixed wireless terminal, and one for said private branch exchange, and computer means for controlling the functioning of said two circuit paths.

5. The private branch exchange (PBX/PABX) according to claim 4, wherein each of said two circuit paths comprises: ring detector means for detecting when the respective said fixed wireless terminal and private branch exchange emit ring signals, hook-switch means for causing the respective said fixed wireless terminal and private branch exchange to go off-hook or on-hook, loop-termination means for providing AC and DC impedance for terminating a call, loop-current monitoring means for determining that a call is in progress or has ended, and audio-path connection means for providing audio connection between said fixed wireless terminal and said private branch exchange; said computer means comprising software means for controlling the operation of each hook-switch means, and audio connection means; said ring-detector means and said loop-current monitor means being coupled to said computer means.

6. The private branch exchange (PBX/PABX) according to claim 4, wherein each of said two circuit paths further comprises loop-current monitor means for monitoring the loop current of the respective fixed wireless terminal and private branch exchange for determining when a call is in progress or has ended, whereby upon the call being ended, a respective said loop-current monitor means detects a loop-current interrupt, causing the computer means to thereby disconnect the audio connection between said fixed wireless terminal and said private branch exchange, and place both said hook switch means in the on-hook condition to cause said fixed wireless terminal and PBX/PABX to reset to an initial condition of waiting for ring signals.

7. A method of making a cellular call using a private branch exchange (PBX/PABX), which private branch exchange comprises a plurality of analog extensions to which are connected telephone-extensions serviced by the private branch exchange, comprising:

(a) initiating an outgoing cellular call via one of said plurality of analog extensions by said one telephone-extension;

(b) said step (a) comprising instructing the private branch exchange that the call to be placed is a cellular call to be made over a cellular radio network;

(c) connecting said one telephone-extension to a fixed wireless terminal coupled to another one of said plurality of extensions of the private branch exchange which fixed wireless terminal provides central-office functions such as ring voltage and dial tone when said one telephone extension is coupled thereto;

(d) dialing a telephone number on said one telephone-extension; and (e) connecting said one telephone-extension to the telephone called via said fixed wireless terminal.

8. The method of making a cellular call using a private branch exchange according to claim 7, wherein said step (b) comprises dialing on said one telephone-extension a code that the private branch exchange recognizes as a command to connect said one telephone-extension to said fixed wireless terminal.

9. The method of making a cellular call using a private branch exchange according to claim 7, wherein said step (c) comprises coupling said one telephone-extension to said fixed wireless terminal by means of an interfacing unit that couples the fixed wireless terminal to an analog telephone extension line of said private branch exchange.

10. The method of making a cellular call using a private branch exchange according to claim 7, further comprising:

(f) terminating the call upon one of the said telephone-extension and the called telephone hanging up.

11. The method of making a cellular call using a private branch exchange according to claim 7, further comprising:

(f) receiving an incoming cellular call on said fixed wireless terminal;

(g) connecting the incoming call from the fixed wireless terminal to the private branch exchange via said another extension thereof;

(h) directing the call to the called PBX/PABX telephone-extension.

12. A method of adapting a private branch exchange (PBX/PABX) for making or receiving a cellular telephone call via a cellular wireless network, which private branch exchange comprises a plurality of analog extensions for connecting a plurality of telephone-extensions thereto in order to be serviced thereby, comprising:

(a) operatively coupling an interfacing means for interfacing a fixed wireless terminal to a private branch exchange to one of said plurality of analog extensions;

(b) connecting a fixed wireless terminal to said interfacing means for providing central-office functions, such as ring voltage and dial tone, to said plurality of telephone-extensions;

(c) said step (b) establishing a bi-directional audio path between the fixed wireless terminal and the private branch exchange, whereby at least one of an incoming call on the fixed wireless terminal may be connected to the private branch exchange, and an outgoing call made by the private branch exchange may be placed over a cellular network via the fixed wireless terminal.

* * * * *

UNITED STATES PATENT AND TRADEMARK OFFICE
CERTIFICATE OF CORRECTION

PATENT NO.       : 6,324,410 B1                                  Page 1 of 1
APPLICATION NO.  : 09/408709
DATED            : November 27, 2001
INVENTOR(S)      : Daniel Giacopelli et al.

It is certified that error appears in the above-identified patent and that said Letters Patent is hereby corrected as shown below:

Column 5:
  Line 22, "hook switch" should read -- hook-switch --;
  Line 22, "audio" should read -- audio-path --;
  Line 23, "detection" should read -- detector --;
  Line 24, "monitor" should read -- monitoring --;
  Line 26, "each" should read -- said --;
  Line 29, "means," should read -- means --;
  Line 30, "both" should be deleted;
  Line 51, "means," should read -- means --;
  Line 51, "audio" should read -- audio-path --;
  Line 52, "ring-detector" should read -- ring detector --;
  Lines 52-53, "monitor" should read -- monitoring --.

Column 6:
  Claim 7, Line 5, "said" should be deleted;
  Claim 7, Line 16, "telephone extension" should read -- telephone-extension --.

Signed and Sealed this

Twenty-seventh Day of May, 2008

JON W. DUDAS
*Director of the United States Patent and Trademark Office*